C. BARNS.
Harvester Rake.

No. 106,108.

Patented Aug. 9, 1870.

Witnesses.

Inventor:
C. Barns
per Munn & Co.
Atty's.

UNITED STATES PATENT OFFICE.

CHARLES BARNS, OF WEST LIBERTY, IOWA.

IMPROVEMENT IN RAKE ATTACHMENTS FOR HARVESTERS.

Specification forming part of Letters Patent No. 106,108, dated August 9, 1870.

*To all whom it may concern:*

Be it known that I, CHARLES BARNS, of West Liberty, in the county of Muscatine and State of Iowa, have invented a new and useful Improvement in Self-Raking Attachment to Harvesters; and I do hereby declare that the following is a full, clear, and exact description thereof, which will enable others skilled in the art to make and use the same, reference being had to the accompanying drawing, forming a part of this specification, in which—

Figure 1:
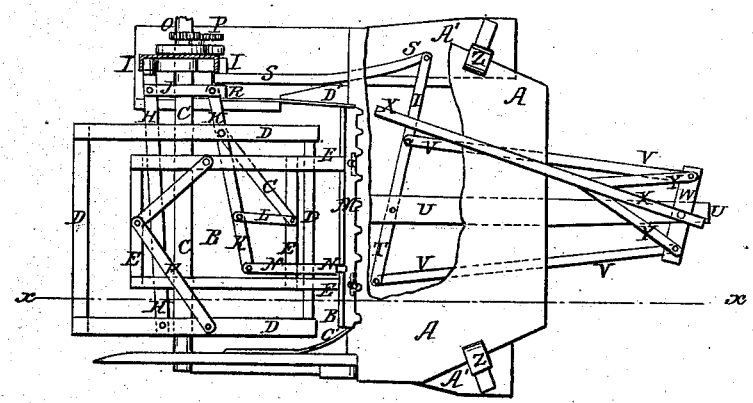
Figure 3:
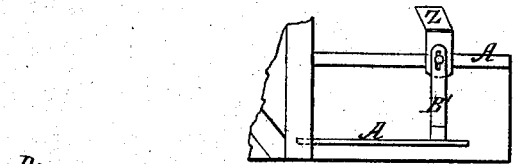
Figure 2:
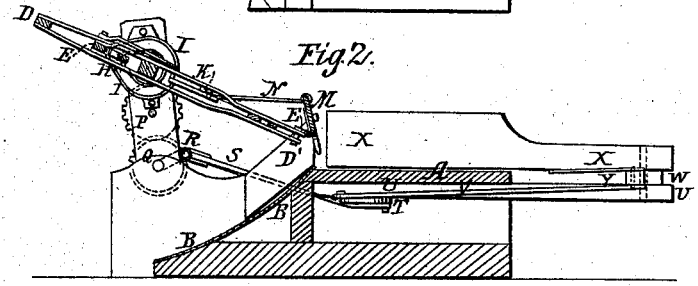

Figure 1 is a top view of the platform of a harvester to which my improvement has been attached, part being broken away to show the construction. Fig. 2 is a vertical cross-section of the same, taken through the line *x x*, Fig. 1. Fig. 3 is a detail side view of the rear part of the platform, showing the binder's seat.

Similar letters of reference indicate corresponding parts

My invention consists in certain improvements on the rake patented to me March 30, 1869; and it consists in the construction and combination of the various parts of the attachment, as hereinafter more fully described.

A is the rear part of the platform, upon which the grain is received for binding. B is the inclined part of the platform, which extends from the cutter-bars to the raised platform A, and which is slightly curved to correspond with the sweep of the rake-head. C is the reel-shaft, which works in bearings in the frame-work of the machine, and to which is rigidly attached the frame D, the side bars of which are made double, for convenience in attaching it to the shaft C, and to enable the various levers to be placed and operated in the plane of said frame. E is a smaller frame, placed within the frame D, and the side bars of which are made double, to receive the shaft C, upon which the frame E slides back and forth. F G are two connecting-bars, the outer ends of which are pivoted to the middle parts of the end bars of the sliding frame E, and the other ends of which are pivoted to the middle parts of the side bars of the stationary frame D, so as to give a lateral movement to the frame E, for the purpose hereinafter described. H is a lever, one end of which is pivoted to and between the bars that form one side of the frame D. The lever H passes out between the bars that form the other side of the frame D, and its outer end, upon which is placed a small friction-roller, enters a groove in the cam-plate I, attached to the frame-work of machine, and through the middle part of which plate the shaft C passes, so that the lever H may be operated by the said groove as the said lever is carried around with the frame D. To the projecting part of the lever H is attached a rigid arm, J, which extends across the shaft C, and to the other end of which is pivoted the outer end of the lever K, which is pivoted to and between the parts of the side bar of the frame D upon the opposite side of the shaft C from the lever H. To the lever K is pivoted one end of a bar, L, the other end of which is pivoted to the middle part of the end of the sliding frame E, so that the said frame E may receive a vertical movement from the lever H, the connecting-bar L being so adjusted as to regulate the amount of longitudinal movement of the frame E to cause the rake-head to move up the inclined or curved platform B. M is the rake-head, the lower edge of which is hinged to the lower ends of the side bars of the sliding frame E.

To the upper edge of the rake-head M is pivoted the lower end of the connecting-bar N, the upper end of which is pivoted to the lever K, to support the upper edge of the rake-head M, and move it outward as the said rake-head moves over the upper part of the platform B.

To the outer end of the shaft C is attached a small gear-wheel, O, the teeth of which mesh into the teeth of the intermediate gear-wheel P, the teeth of which mesh into the teeth of the gear-wheel Q, attached to the projecting end of the crank-shaft R, which revolves in bearings in the frame-work of the machine, and to the crank of which is pivoted one end of the connecting-bar S, the other end of which is pivoted to the end of the lever T.

The lever T extends beneath the platform A, and is pivoted to a bar or beam, U, attached to the frame-work of the machine, and projecting at the rear of the platform A.

To the lever T, at equal distances from its pivoting-point, and upon the opposite sides of the beam U, are pivoted the inner ends of the bars V, the outer ends of which are pivoted to the opposite ends of the short equal-armed lever W, which is pivoted to the outer end of the bar or beam U, and to the middle part of which is secured the rear end of the gatherer X, the connection between which and the said lever W is strengthened by the braces Y.

The gatherer X extends across the upper surface of the platform A, and its operating levers are so arranged that the said gatherer, as often as the gavels are delivered upon the platform A by the rake M, may sweep them alternately to the sides of the platform A, where they are received by the binders, bound, and dropped to the ground.

The binders sit upon the seat Z, adjustably attached to the sides of the platform A, with their feet resting upon the binders' stands A', the forward ends of which are attached to the frame-work of the machine, and which are supported from the sides of the platform A by the bars B'.

C' is a guide, attached to the frame-work of the machine at the outer side of the platform B, and which is curved to correspond with the lateral movement of the rake M.

To the frame-work of the machine, at the inner side of the platform B, is attached a spring-plate, D', which guides the grain as it is being carried up the platform B into a proper position to be received by the gatherer X, and the elasticity of which allows it to be forced back by the end of the rake-head M, to enable the said rake-head to pass.

The lateral movement of the rake-head M, which is from the standing-grain side of the machine, carries the grain in that direction, and enables the platform A to be so constructed that the binder upon the standing-grain side of the machine may have room to work without being interfered with by the standing grain.

Having thus described my invention, what I claim as new, and desire to secure by Letters Patent, is—

1. The combination of the pivoted bars or braces F, the sliding frame E, stationary frame D, and shaft C, with a revolving rake, substantially as herein shown and described, and for the purpose set forth.

2. The combination of levers H K, frames D E, bars J L N, rake-head M, shaft C, and grooved plate I, all relatively arranged and operated as and for the purpose described.

3. The combination of the lever T, connecting-bars V, and equal-armed lever W, with the gatherer X and platform A, constructed and arranged substantially as herein shown and described, and for the purpose set forth.

4. The combination of the gear-wheels O P Q, crank-shaft R, and connecting-bar S, with the elements of the preceding claim, all constructed and arranged substantially as herein shown and described, and for the purpose set forth.

5. The combination of the curved guide C' and spring-plate D', with the curved platform B, platform A, and gatherer X, substantially as herein shown and described, and for the purpose set forth.

CHARLES BARNS.

Witnesses:
FREDERICK SHOWALTER,
ALONZO SHAW.